(12) United States Patent
Kim et al.

(10) Patent No.: US 8,057,665 B2
(45) Date of Patent: Nov. 15, 2011

(54) COLD WATER TANK AND WATER TREATMENT APPARATUS HAVING THE SAME

(75) Inventors: Jae Man Kim, Seoul (KR); In Du Choi, Anyang (KR)

(73) Assignee: Woongjin Coway Co., Ltd., Choongcheongnam-Do (KR)

(*) Notice: Subject to any disclaimer, the term of this patent is extended or adjusted under 35 U.S.C. 154(b) by 330 days.

(21) Appl. No.: 12/494,214

(22) Filed: Jun. 29, 2009

(65) Prior Publication Data

US 2010/0163479 A1    Jul. 1, 2010

(30) Foreign Application Priority Data

Dec. 30, 2008  (KR) .................. 10-2008-0136733
Jun. 18, 2009  (KR) .................. 10-2009-0054281

(51) Int. Cl.
  *B01D 35/01*   (2006.01)
(52) U.S. Cl. ..... 210/120; 210/121; 210/181; 210/257.1; 210/416.3; 210/472; 210/539; 62/394; 137/202; 137/388; 137/429

(58) Field of Classification Search .................. 210/120, 210/121, 181, 257.1, 416.3, 472, 539; 62/394; 137/202, 388, 429
See application file for complete search history.

(56) References Cited

U.S. PATENT DOCUMENTS

| | | | | |
|---|---|---|---|---|
| 1,946,691 A | * | 2/1934 | Harr | 137/170.2 |
| 2,063,002 A | * | 12/1936 | Smith | 62/394 |
| 2,418,994 A | * | 4/1947 | Taylor | 62/394 |
| 5,855,796 A | * | 1/1999 | Joung | 210/744 |

* cited by examiner

*Primary Examiner* — Matthew Savage
(74) *Attorney, Agent, or Firm* — McDermott Will & Emery LLP (57) ABSTRACT

Disclosed are a cold water tank and a water treatment apparatus. The cold water tank includes a tank body, a water inlet pipe provided at the tank body to convey water into the tank body, a water outlet pipe provided at the tank body to convey the water out of the tank body, and including an air vent hole, and a floating member movably provided at the water outlet pipe to block the air vent hole when the water filling the tank body reaches a height of the air vent hole. The water in the upper portion of the tank body is prevented from passing through the air vent hole and draining through the water outlet pipe, thereby preventing the cooler water in the lower portion from mixing with the hotter water in the upper portion. Only the cooler water in the lower portion can be supplied to a user.

8 Claims, 10 Drawing Sheets

COLD WATER TANK AND WATER TREATMENT APPARATUS HAVING THE SAME

CROSS-REFERENCE TO RELATED APPLICATIONS

This application claims the priority of Korean Patent Application Nos. 2008-0136733 filed on Dec. 30, 2008 and 2009-0054281 filed on Jun. 18, 2009 in the Korean Intellectual Property Office, the disclosure of which is incorporated herein by reference.

BACKGROUND OF THE INVENTION

1. Field of the Invention

The present invention relates to a cold water tank and a water treatment apparatus having the same.

2. Description of the Related Art

Cold water tanks refer to devices, which are connected to or include cooling units to cool the water introduced therein, and drain the cooled water out of the tanks.

Figure 1A:
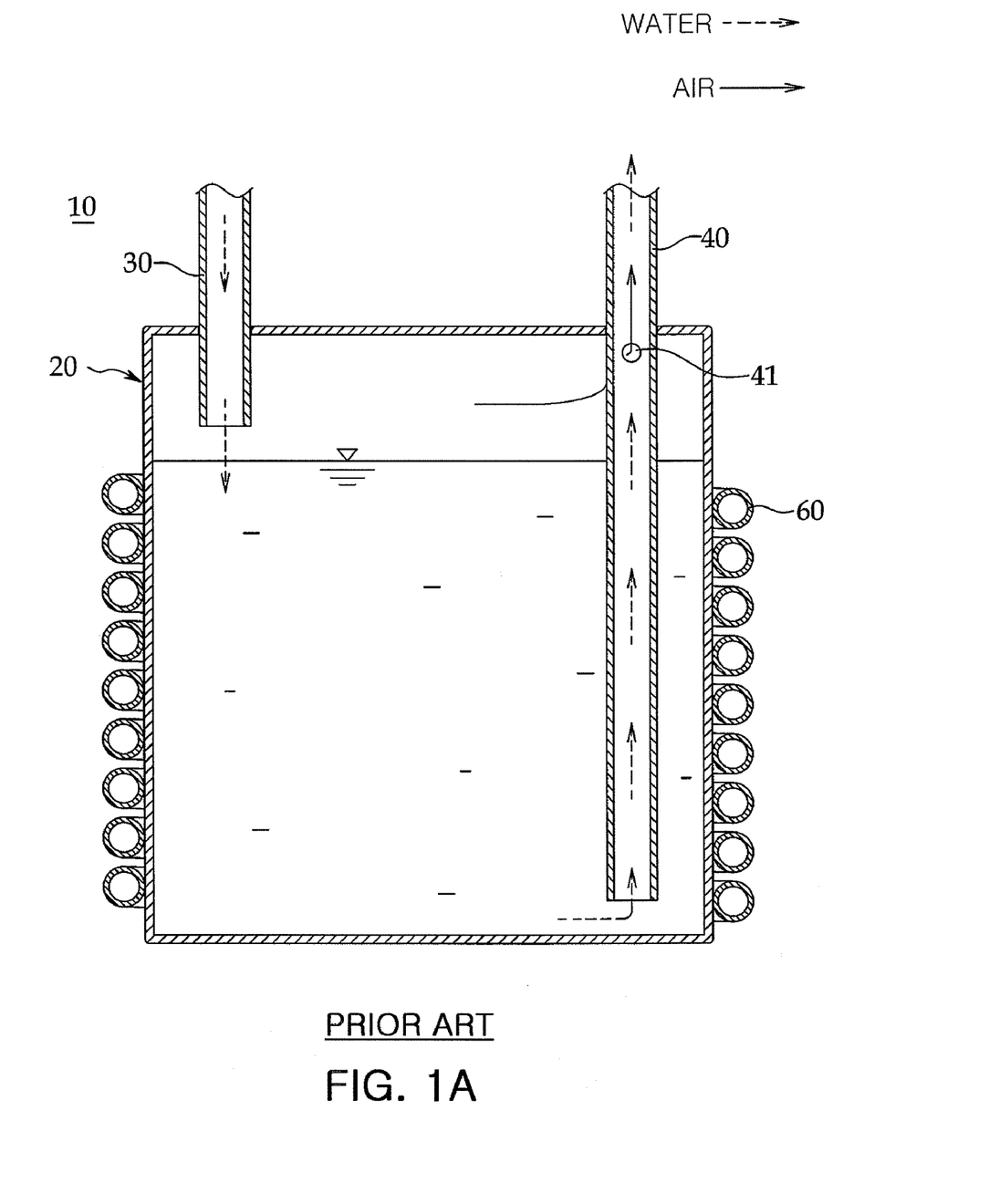
FIG. 1A illustrates a related art cold water tank when a tank body of the cold water tank is partially filled with water.
Figure 1B:
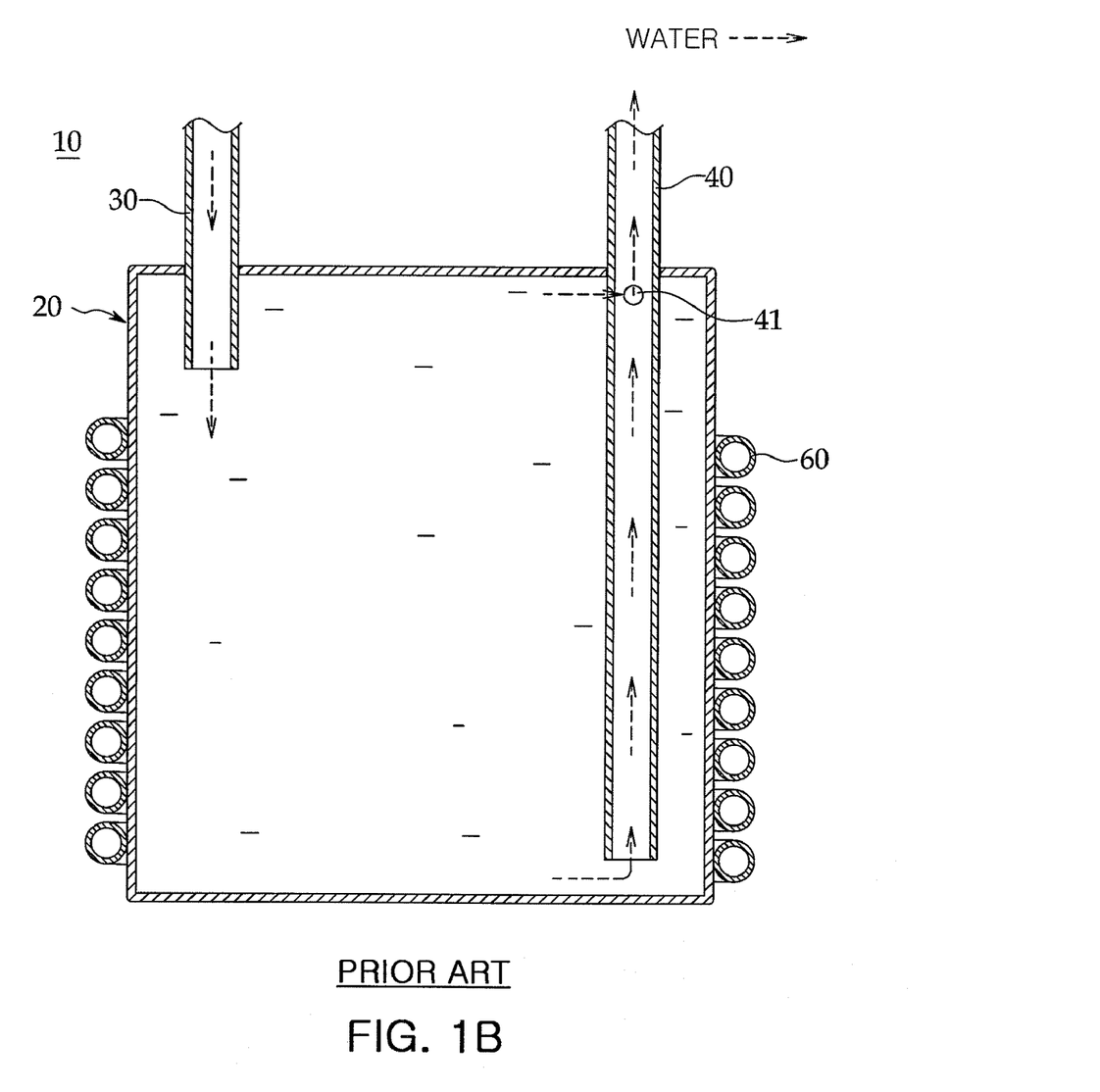
FIG. 1B illustrates the related art cold water tank when the tank body of the cold water tank is completely filled with water.

Referring to FIGS. 1A and 1B, a cold water tank may include a tank body 20 receiving and storing water, a water inlet pipe 30 provided at the tank body 20 to convey water into the tank body 20, and a water outlet pipe 40 provided at the tank body 20 to convey the water out of the tank body 20, and having an air vent hole 41 formed in its upper portion.

The water inlet pipe 30, as shown in FIGS. 1A and 1B, has its one end placed in the upper portion of the tank body 20, thereby facilitating water inflow into the tank body 20. The water outlet pipe 40 has its one end placed in the lower portion of the tank body 20, and this allows users to be provided with the water existing in the lower portion of the tank body 20 at a relatively low temperature. As depicted in the drawings, a refrigerant pipe 60 as a cooling unit is wound around the circumference of the tank body 20 to cool the water in the tank body 20. That is, the water, having flowed in the tank body 20 through the water inlet pipe 30, is cooled by heat exchange with a refrigerant flowing in the refrigerant pipe 60. The water cooled in the above manner is discharged out of the tank body 20 through the water outlet pipe 40.

While water is flowing into the tank body 20 through the water inlet pipe 30, as shown in FIG. 1A, the air within the tank body 20 passes through the air vent hole 41 in the upper portion of the water outlet pipe 40 and exits out of the tank body 20 through the water outlet pipe 40. As shown in FIG. 1B, if the tank body 20 is completely filled with water, all of the air in the tank body 20 exits through the water outlet pipe 40 via the air vent hole 41. If, in this state, the water in the lower portion of the tank body 20 is discharged through the water outlet pipe 40 to supply cooled water to a user, then the water in the upper portion of the tank body 20 undesirably passes through the air vent hole 41 and drains through the water outlet pipe 40.

As described above, the water existing in the upper portion of the tank body 20 may be different in temperature from the water existing in the lower portion of the tank body 20. That is, the water in the upper portion of the tank body 20 has a higher temperature than the water in the lower portion of the tank body 20.

Accordingly, as described with reference to FIG. 1B, in the event that the water in the upper portion of the tank body 20 passes through the air vent hole 41 and drains through the water outlet pipe 40, the water in the upper portion and the water in the lower portion, having different temperatures, may mix undesirably in the water outlet pipe 40. That is, the water existing in the upper portion of the tank body 20 at a relatively high temperature may be supplied, mixed with the water existing in the lower portion of the tank body 20 at a relatively low temperature. This may result in the supply of water having a higher temperature than desired.

The above limitations may also be caused in water treatment apparatuses including the cold water tank 10, such as water purifiers or water ionizers.

SUMMARY OF THE INVENTION

Accordingly, the present invention is directed to a cold water tank and a water treatment apparatus having the same, which substantially obviates one or more problems due to limitations and disadvantages of the related art.

An aspect of the present invention provides a cold water tank and a water treatment apparatus having the same, which can prevent water in the upper portion of a tank body from draining into a water outlet pipe through an air vent hole in the water outlet pipe provided at a tank body of a cold water tank.

An aspect of the present invention also provides a cold water tank and a water treatment apparatus having the same, which can prevent the water, existing in the lower portion of the tank body at a relatively low temperature, from mixing with the water existing in the upper portion of the tank body at relatively high temperature.

An aspect of the present invention also provides a cold water tank and a water treatment apparatus having the same, which can supply water existing only in the lower portion of the tank body at a relatively low temperature to a user.

A cold water tank associated with an exemplary embodiment may have the following features to realize at least one of the above aspects.

The present invention is basically based on blocking an air vent hole in a water outlet pipe provided at a tank body of a cold water tank, by using a floating member.

According to an aspect of the present invention, there is provided a cold water tank including: a tank body; a water inlet pipe provided at the tank body to convey water into the tank body; a water outlet pipe provided at the tank body to convey the water out of the tank body, and including an air vent hole; and a floating member movably provided at the water outlet pipe to block the air vent hole when the water filling the tank body reaches a height of the air vent hole.

The water outlet pipe may be provided with a stopper preventing the floating member from descending to a predetermined height or lower.

The tank body may be provided with a receiving part receiving the floating member as the floating member ascends, and the air vent hole may be formed at the same height as the receiving part, in the water outlet pipe.

The receiving part may be provided with a blocking member including another air vent hole.

The water inlet pipe may be connected to a water treatment apparatus including one or more water filters to convey water filtered through the water filters into the tank body.

The water inlet pipe may be directly connected to an outlet of the last water filter among the one or more water filters, and the water in the tank body may drain out of the tank body through the water outlet pipe by the pressure of water discharged from the outlet of the last water filter.

According to another aspect of the present invention, there is provided a water treatment apparatus including: a water source supplying water; and a cold water tank connected to the water supply source and receiving and discharging water by the pressure of water supplied from the water supply source.

The water treatment apparatus may further include one or more water filters connected between the water supply source and the cold water tank, and the cold water tank may be connected to an outlet of the last water filter among the one or more water filters.

BRIEF DESCRIPTION OF THE DRAWINGS

The above and other aspects, features and other advantages of the present invention will be more clearly understood from the following detailed description taken in conjunction with the accompanying drawings, in which.

DETAILED DESCRIPTION OF THE PREFERRED EMBODIMENT

For a better understanding of the features of the present invention, exemplary embodiments of the present invention will now be described in detail with reference to the accompanying drawings.

Hereinafter, preferred embodiments of the present invention will be described with reference to the accompanying drawings to fully explain the technical features of the present invention. The invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference numerals in the drawings denote like elements.

Embodiments associated with the present invention are basically based on blocking an air vent hole formed in a water outlet pipe provided at a tank body of a cold water tank, by using a floating member.

As in exemplary embodiments depicted in FIGS. 2A through 4B, a cold water tank may include a tank body 200, a water inlet pipe 300, a water outlet pipe 400, and a floating member 500.

The tank body 200 may be connected directly to a water supply source such as a faucet via the water inlet pipe 300. The water inlet pipe 300 may be connected to a water treatment apparatus such as a water purifier or a water ionizer. A refrigerant pipe 600 as a cooling unit is wound around the circumference of the tank body 200 to cool the water introduced to the tank body 200. That is, the water in the tank body 200 can be cooled by heat exchange between a refrigerant flowing in the refrigerant pipe 600 and the water in the tank body 200. However, the cooling unit that cools water having flowed into the tank body 200 is not limited to the refrigerant pipe 600 of this embodiment, and any device is usable provided that it is capable of cooling the water in the tank body 200.

As in the exemplary embodiments depicted in FIGS. 2A through 4B, the water inlet pipe 300 may be provided at the tank body 200 so as to convey water into the tank body 200. The water inlet pipe 300, as described above, may be connected directly to a water supply source such as a faucet or connected to a water treatment apparatus. In this case, a water treatment apparatus 700 as in an embodiment depicted in FIG. 5 may include one or more water filters 710. Thus, the water filtered through the water filter 710 may flow into the tank body 200. Also, as in the embodiment depicted in FIG. 5, the water inlet pipe 300 may be connected directly to the outlet of the last water filter 710 among the one or more water filters 710. That is, the water treatment apparatus 700 connected to the water inlet pipe 300 may be a tankless water purifier without a purified water storage tank storing the water filtered through the water filter 710. In this case, the water may be discharged out of the tank body 200 through the water outlet pipe 400 by the discharge pressure of the water from the outlet of the last water filter 710. However, the water treatment apparatus 700 connected to the water inlet pipe 300 is not limited to the tankless water purifier depicted in FIG. 5, and may be a water purifier that includes a purified water storage tank (not shown), or a water ionizer. Any device may serve as the water treatment apparatus 700, provided that it can be connected to the water inlet pipe 300 and supply water to the tank body 200.

As shown in FIGS. 2A through 4B, the water inlet pipe 300 may be provided at the tank body 200 with its one end placed in the upper portion of the tank body 200. This can facilitate the water inflow to the tank body 200.

As in the embodiments depicted in FIGS. 2A through 4B, the water outlet pipe 400 may be provided at the tank body 200 such that the water flowed and cooled in the tank body 200 can drain out of the tank body 200. Also, the water outlet pipe 400 may be connected to a faucet 720 as in the embodiment depicted in FIG. 5, or to a cock (not shown) in order to supply the water cooled in the tank body 200 to a user. Accordingly, the water received and cooled in the tank body 200 drains through the water outlet pipe 400 and may be supplied to a user through the faucet 720, a cock or the like connected to the water outlet pipe 400.

As shown in FIGS. 2A through 4B, the water outlet pipe 400 may be provided at the tank body 200 with its one end placed in the lower portion of the tank body 200. This enables a user to be provided with the water existing in the lower portion of the tank body 200 at a relatively low temperature.

As in the embodiments depicted in FIGS. 2A through 4B, an air vent hole 410 may be formed in the upper portion of the water outlet pipe 400. Accordingly, as the water is flowing into the tank body 200 through the water inlet pipe 300, the air in the tank body 200 may pass through the air vent hole 410 and exits out of the tank body 200 through the water outlet pipe 400.

As in the embodiments depicted in FIGS. 2A through 4B, a floating member 500 may be movably provided at the water outlet pipe 400. The floating member 500 can move up and down with respect to the water outlet pipe 400 according to the water level in the tank body 200. If, as shown in FIGS. 2B and 3B, water flowing into the tank body 200 reaches the height of the air vent hole 410 of the water outlet pipe 400, the floating member 500 ascends along the water outlet pipe 400 on the rising water surface, thereby blocking the air vent hole 410. This may prevent the water in the upper portion of the tank body 200 from draining through the water outlet pipe 400 via the air vent hole 410 of the water outlet pipe 400.

As in the embodiments depicted in FIGS. 2A through 4B, the water outlet pipe 400 may be provided with a stopper 510. The stopper 510 may prevent the floating member 500 from descending to a predetermined height or lower as the water level in the tank body 200 drops.

Figure 3A:
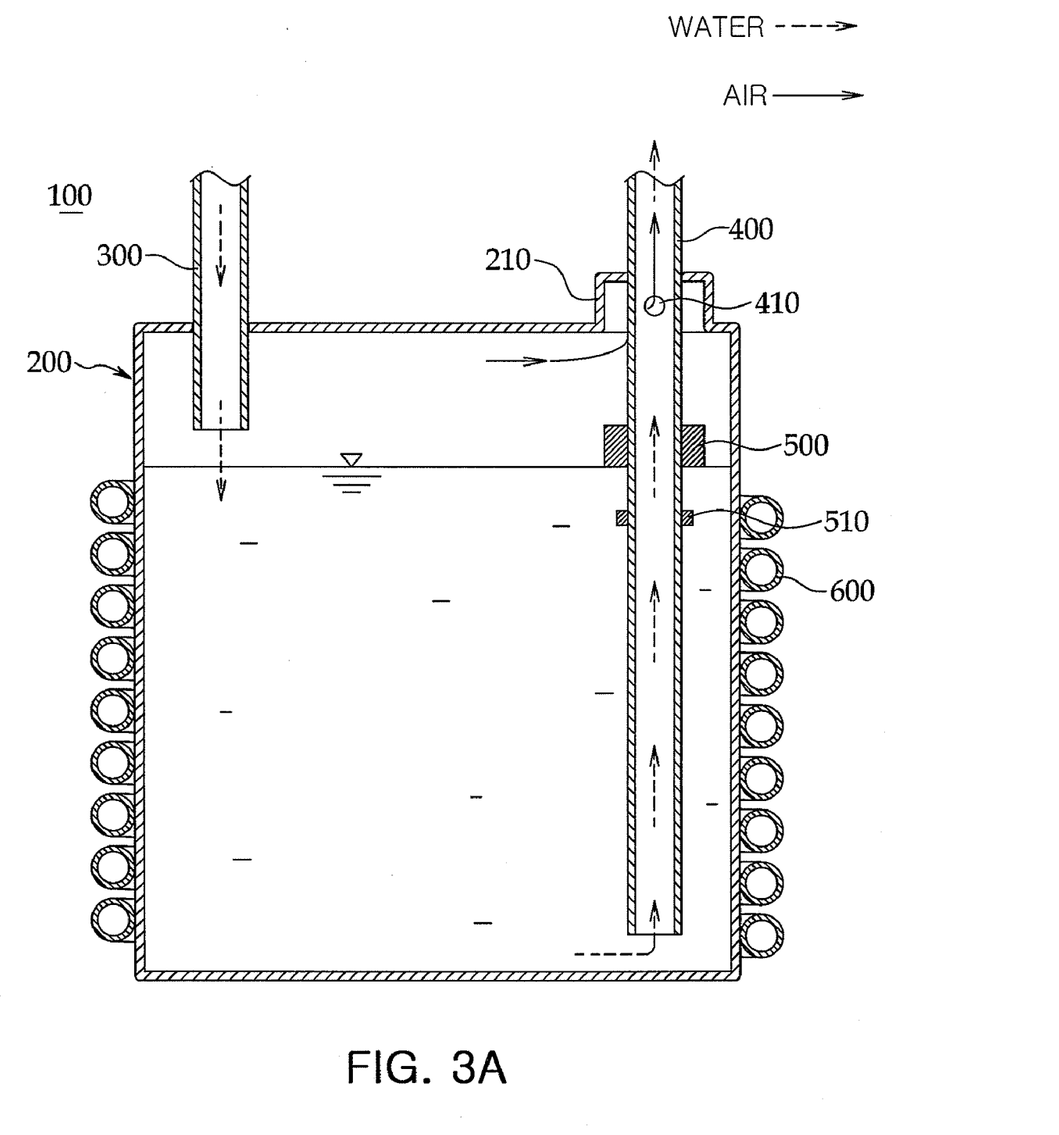
FIG. 3A illustrates a cold water tank according to another exemplary embodiment of the present invention, when a tank body of the cold water tank is partially filled with water.
Figure 3B:
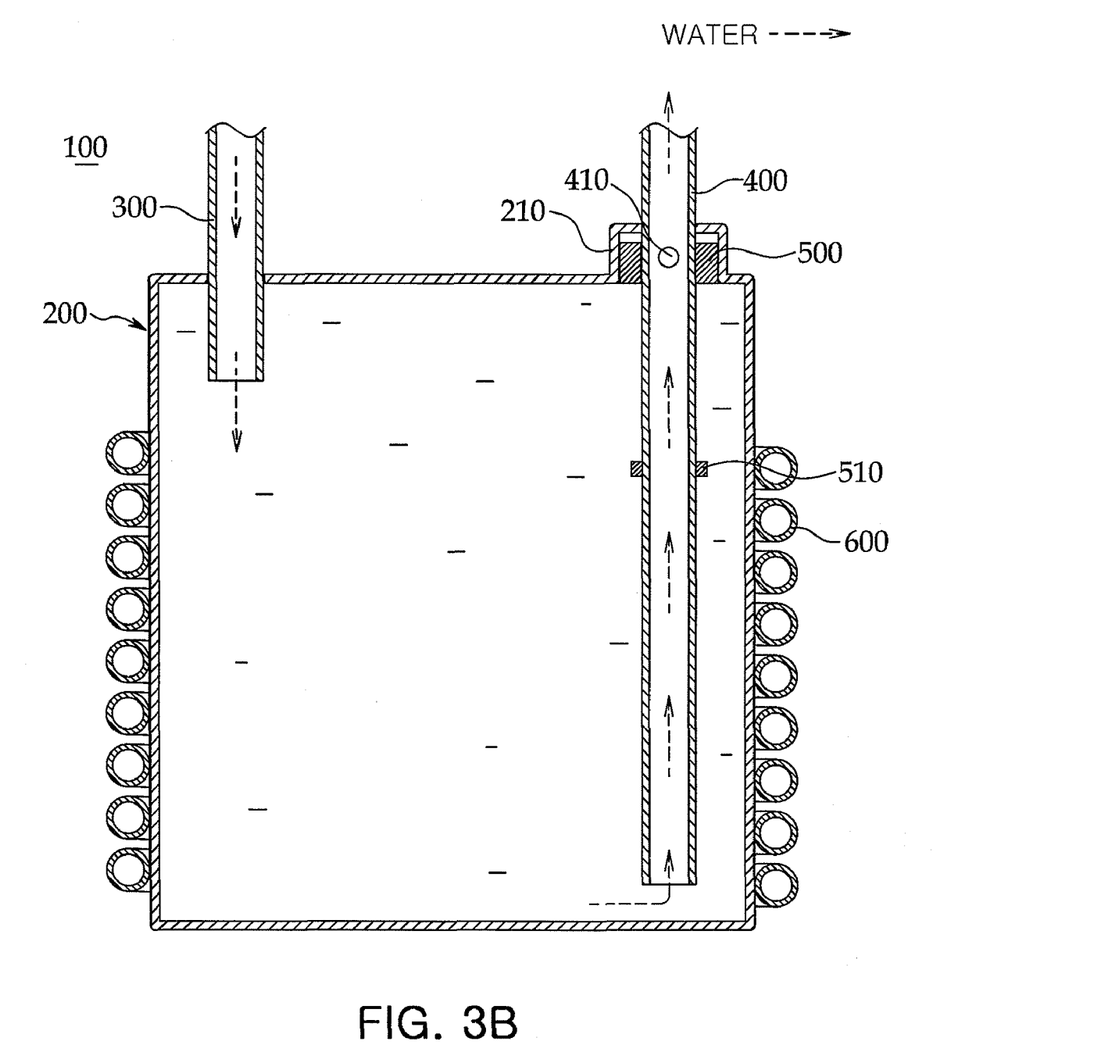
FIG. 3B illustrates the cold water tank of FIG. 3A, when a tank body of the cold water tank is completely filled with water.
Figure 3C:
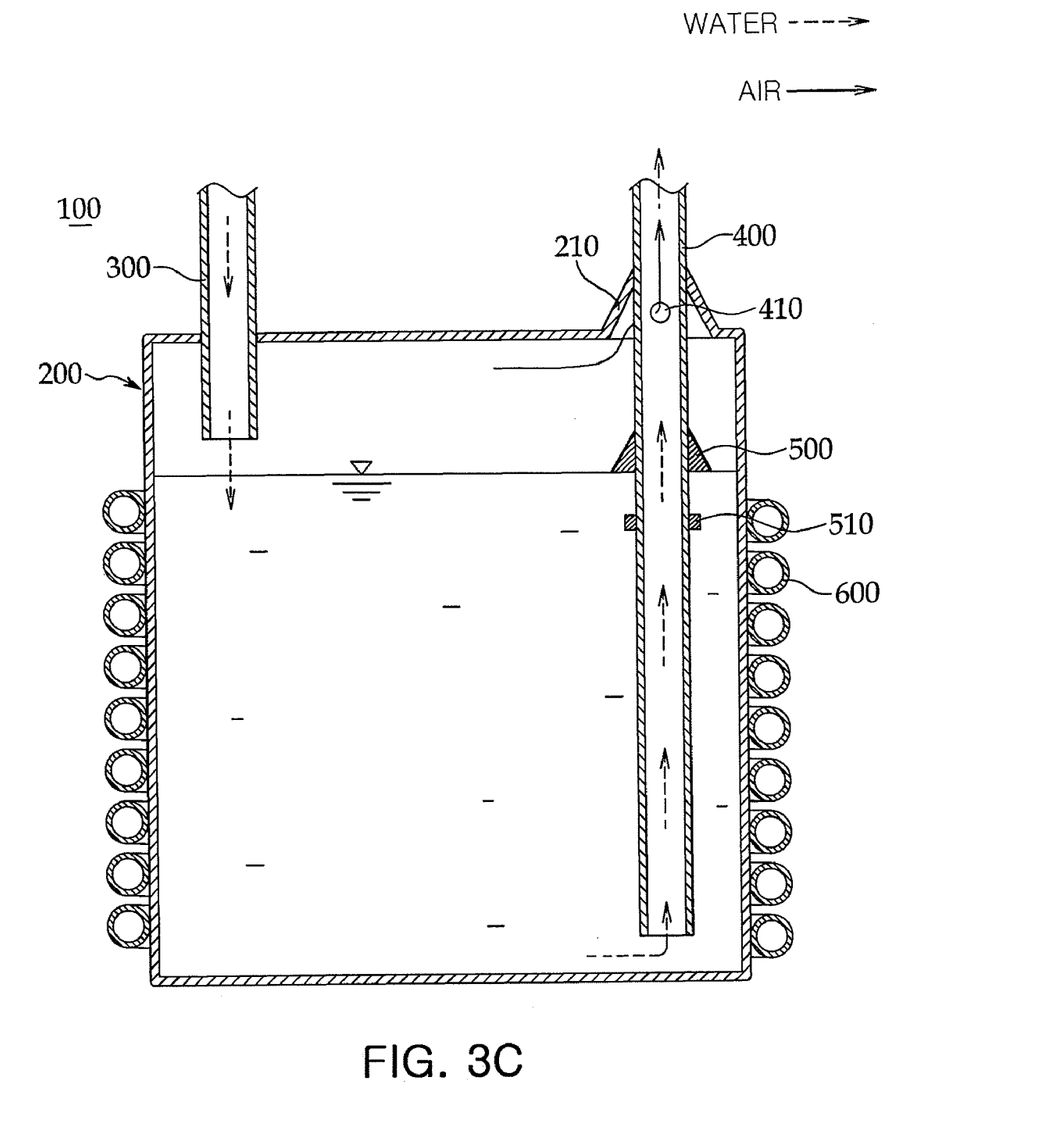
FIG. 3C illustrates a cold water tank according to another exemplary embodiment of the present invention, which includes a receiving part with a modified shape.

As in the embodiment depicted in FIGS. 3A and 3B, the tank body 200 may include a receiving part 210 receiving the floating member 500 that has ascended. In this case, the air vent hole 410 as shown in FIGS. 3A and 3B may be formed in the water outlet pipe 400 at the same height as the receiving part 210. The receiving part 210, as shown in FIGS. 3A and 3B, may have a quadrangular shape, that is, a shape with a constant width regardless of height. Alternatively, the receiving part 210 may have a triangular shape as shown in FIG. 3C, that is, a shape decreasing in width with height. In this case, the floating member 500 may also have a shape corresponding to the shape of the receiving part 210. However, the shapes of the receiving part 210 and the floating member 500 are not limited to this embodiment, and any shape may be applied if it ensures the blockage of the air vent hole 410 while facilitating the accommodation of the floating member 500 in the receiving part 210.

Figure 4A:
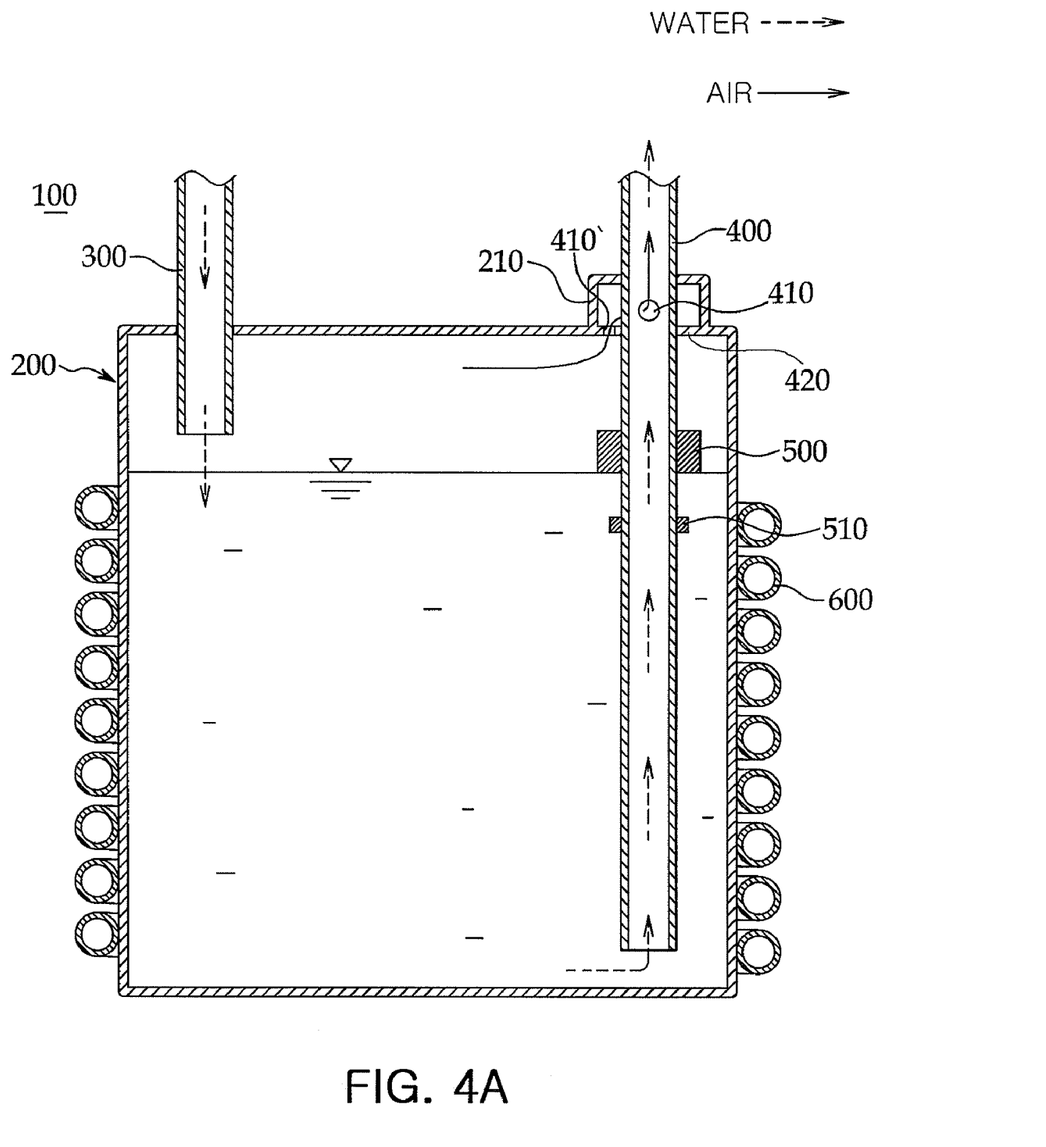
FIG. 4A illustrates a cold water tank according to another exemplary embodiment of the present invention, when a tank body of the cold water tank is partially filled with water.
Figure 4B:
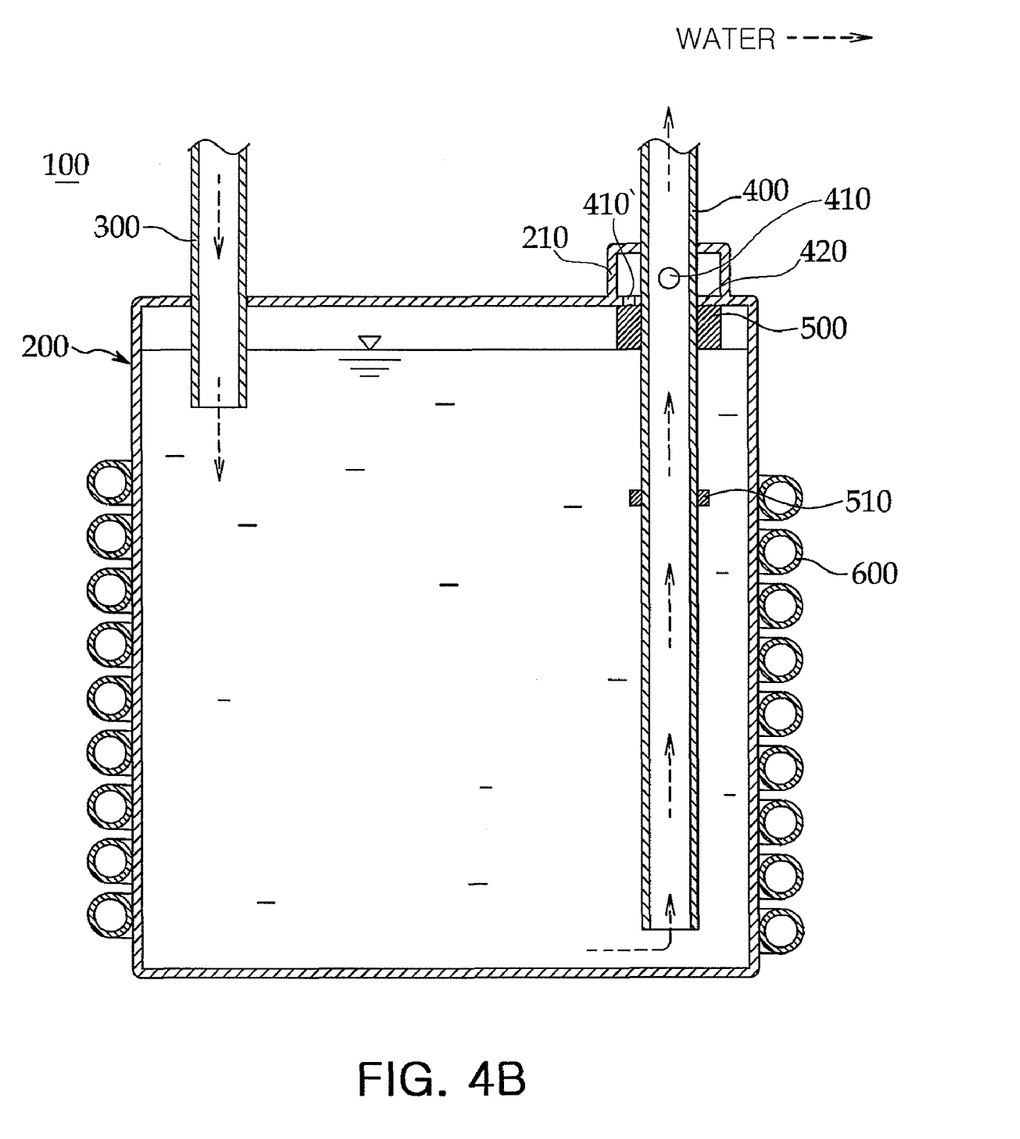
FIG. 4B illustrates the cold water tank of FIG. 4A, when the tank body of the cold water tank is completely filled with water.

As in the embodiment depicted in FIGS. 4A and 4B, the receiving part 210 may include a blocking member 420, and another air vent hole 410' may be formed in the blocking member 420. In this case, as the tank body 200 fills with water as shown in FIG. 4B, the floating member 500 blocks the air vent hole 410' in the blocking member 420 with its ascent prevented by the blocking member 420. This prevents the water in the upper portion of the tank body 200 from passing through the two air vent holes 410 and 410' and draining through the water outlet pipe 400.

The water treatment apparatus 700, including the cold water tank 100 according to an exemplary embodiment of the present invention, may include a water supply source supplying water, and the above cold water tank 100 connected to the water supply source and receiving and discharging water by the pressure of the water supplied from the water supply source. For example, the water supply source may be a faucet or the like, and the water inlet pipe 300 provided at the tank body 200 of the cold water tank 100 may be connected to the water supply source such as a faucet. Accordingly, the water supplied from the water supply source such as a faucet may be introduced to the cold water tank 100 through the water inlet pipe 300. The water introduced to the cold water tank 100 in this manner may be cooled by heat exchange with a refrigerant flowing in the refrigerant pipe 600 provided at the tank body 200 of the cold water tank 100. The water cooled in the cold water tank 100 may be discharged through the water outlet pipe 400 provided at the tank body 200 of the cold water tank 100 by the water supply pressure of the water supply source.

Figure 5:
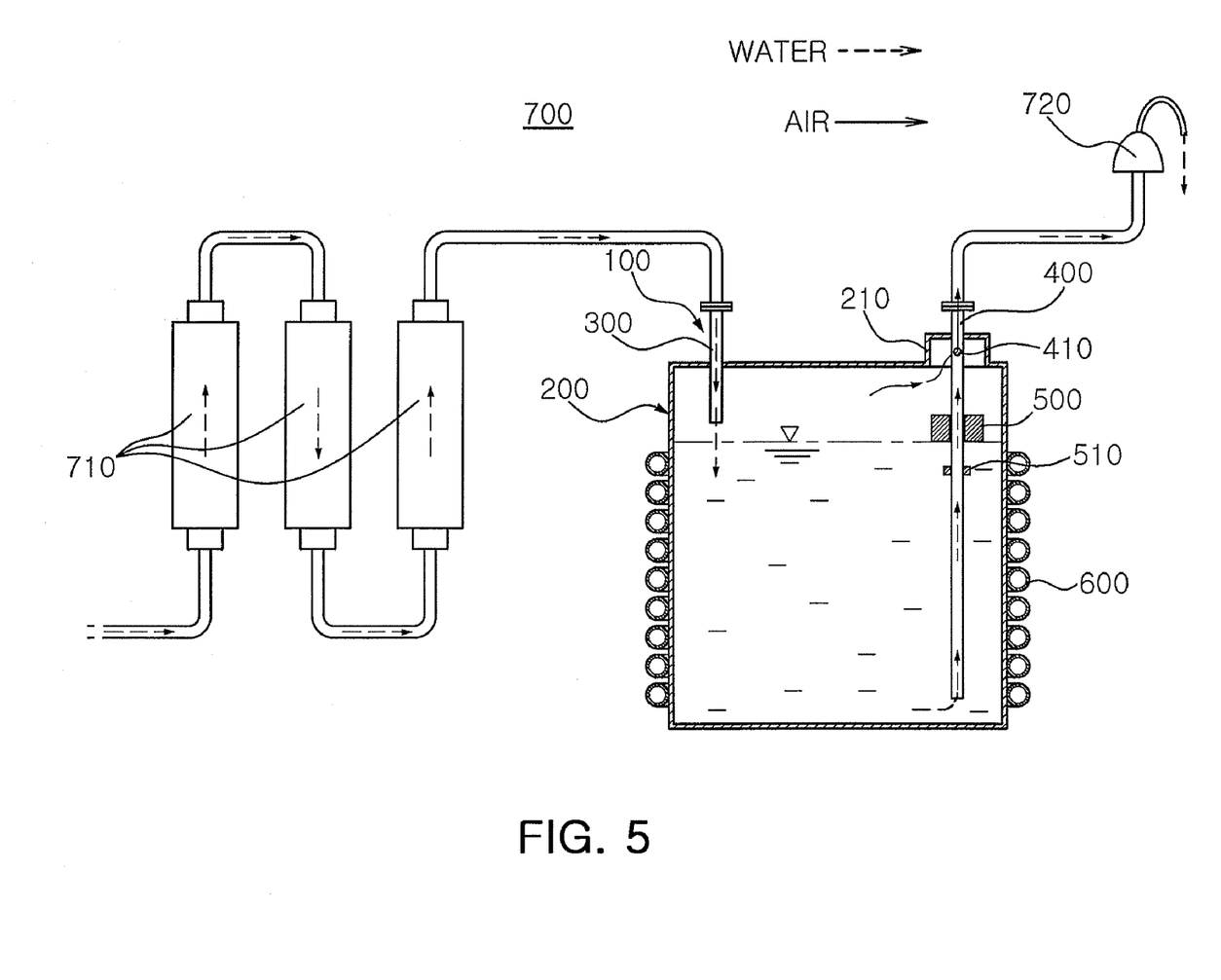
FIG. 5 illustrates a water treatment apparatus according to an exemplary embodiment of the present invention, which includes the cold water tank depicted in FIG. 3A.

As in the embodiment depicted in FIG. 5, the water treatment apparatus 700 including the cold water tank 100 according to an exemplary embodiment of the present invention may further include one or more water filters 710 connected between a water supply source (not shown) and the cold water tank 100. That is, the water treatment apparatus 700 according to an exemplary embodiment of the present invention may include a water supply source (not shown), one or more water filters 710 and the cold water tank 100. In this case, the cold water tank 100 may be connected to the outlet of the last water filter 710 among the one or more water filters 710.

The water treatment apparatus 700 according to the embodiment of FIG. 5 is illustrated as a tankless water purifier which does not include a purified water storage tank storing the water filtered through the water filter 710, and in which the water is filtered, flowing in the water filter 710 by the pressure of the water flowing into the water treatment apparatus 700. However, the water treatment apparatus 700, including the cold water tank 100 according to an exemplary embodiment of the present invention, is not limited to the depicted embodiment, and may utilize a water purifier that includes a purified water storage tank, or a water ionizer.

As in the embodiment depicted in FIG. 5, the water treatment apparatus 700 may include one or more water filters 710. Also, as in the depicted embodiment, the last water filter 710 among the one or more water filters 710 may have an outlet connected to the cold water tank 100 according to the present invention, that is, the water inlet pipe 300 of the cold water tank 100. Accordingly, the water filtered through the one or more water filters 710 may flow into the tank body 200 of the cold water tank 100 through the water inlet pipe 300. The water flowed into the tank body 200 may be cooled by heat exchange with the refrigerant flowing inside the refrigerant pipe 600 provided at the tank body 200.

As in the embodiment depicted in FIG. 5, the water outlet pipe 400 of the cold water tank 100 according to the present invention may be connected to a faucet 720. Accordingly, the water cooled in the tank body 200 of the cold water tank 100 may be discharged through the water outlet pipe 400 and supplied to a user through the faucet 720 connected to the water outlet pipe 400.

Hereinafter, the operation of the cold water tank 100 and the water treatment apparatus 700 having the same will be described.

When water flows into the water treatment apparatus 700 according to the embodiment of FIG. 5, the water is filtered while passing through the one or more water filters 710 in the water treatment apparatus 700.

Figure 2A:
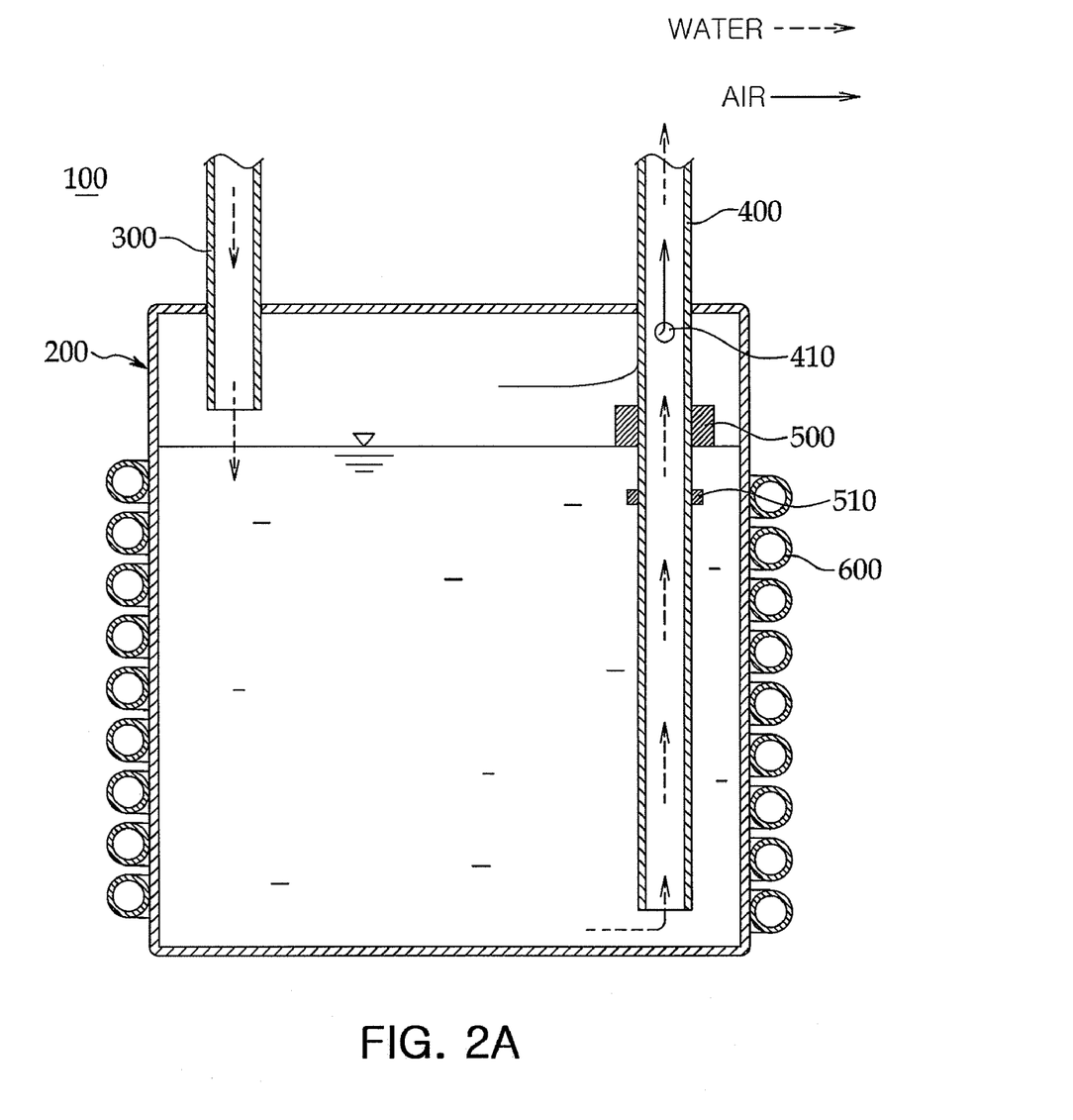
FIG. 2A illustrates a cold water tank according to an exemplary embodiment of the present invention, when a tank body of the cold water tank is partially filled with water.

The water filtered through the one or more water filters 710 is introduced to the tank body 200 through the water inlet pipe 300 provided at the tank body 200 of the cold water tank 100 as shown in FIGS. 2A through 4B. As the water flows into the tank body 200, the air in the tank body 200, as shown in FIGS. 2A and 3A, passes through the air vent hole 410 formed in the water outlet pipe 400 provided at the tank body 200, and exits out of the tank body 200 through the water outlet pipe 400. In the case of the embodiment depicted in FIG. 4A, the air exists out of the tank body 200 after passing through the air vent hole 410' formed in the blocking member 420 and the air vent hole 410 formed in the water outlet pipe 400.

The floating member 500 is movably provided at the water outlet pipe 400. As the water level in the tank body 200 rises due to the water inflow, the floating member 500 also ascends along the water outlet pipe 400. In the case of the embodiment depicted in FIGS. 3A and 3B, the floating member 500 ascending with the rise of the water level in the tank body 200 blocks the air vent hole 410 formed in the upper portion of the water outlet pipe 400 when the tank body 200 is completely filled with water. Also, in the case of the embodiment depicted in FIG. 4B, the floating member 500 blocks the air vent hole 410' formed in the blocking member 420. In this state, the water cooled in the tank body 200 is supplied to a user by the pressure of the water having flowed into the tank body 200 of the cold water tank 100. At this time, the floating member 500 blocks the air vent hole 410 in the case of the embodiments depicted in FIGS. 2B and 3B, and blocks the air vent hole 410' in the case of the embodiment depicted in FIG. 4B. Accordingly, the water in the upper portion of the tank body 200 does not flow into the water outlet pipe 400 via the air vent holes 410 and 410'. This prevents the mixing of the water in the lower portion of the tank body 200 and the water in the upper portion of the tank body 200. The water only in the lower portion of the tank body 200 is supplied to a user through the water outlet pipe 400, and the faucet 720 in the case of the embodiment depicted in FIG. 5. Consequently, a user can be provided with water existing in the lower portion of the tank body 200 at a relatively low temperature.

Figure 2B:
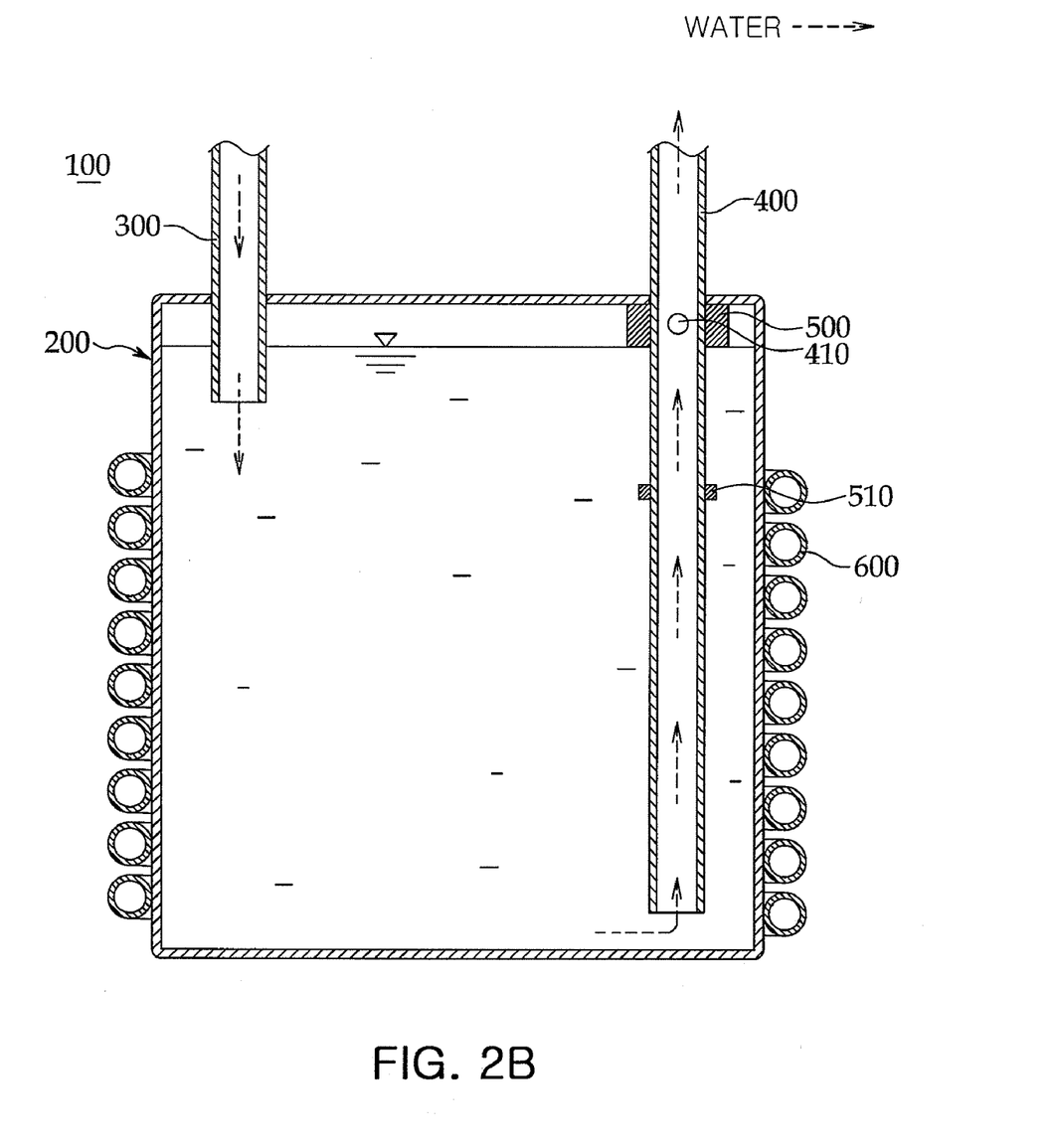
FIG. 2B illustrates the cold water tank of FIG. 2A, when the tank body of the cold water tank is completely filled with water.

In the cases of FIGS. 2B and 3B, the water draining through the water outlet pipe 400 may pass through the air vent hole 410 of the water outlet pipe 400 and apply pressure to the floating member 500. This may move the floating member 50, creating a gap between the floating member 500 and the air vent hole 410. The gap may lead to the inflow of the water that is to drain through the water outlet pipe 400.

However, in the case of FIG. 4B, the floating member 500 blocks the air vent hole 410' with its ascent prevented by the blocking member 420. Even if the water draining through the water outlet pipe 400 passes through the air vent hole 410, it does not apply pressure directly to the floating member 500. That is, the water having passed through the air vent hole 410 of the water outlet pipe 400 reaches another air vent hole 410'after filling the receiving part 210. Accordingly, the water flowing through the water outlet pipe 400 does not apply any direct pressure to the floating member 500, thus gap creation does not occur between the floating member 500 and the air vent hole 410'. Accordingly, the water draining through the water outlet pipe 400 is prevented from flowing back into the tank body 200 via the air vent holes 410 and 410'.

According to the embodiments of the present invention, the cold water tank 100 and the water treatment apparatus 700 having the same may prevent the water in the upper portion of the tank body 200 from draining through the water outlet pipe 400 via the air vent hole 410 formed in the water outlet pipe 400 provided at the tank body 200 of the cold water tank 100. This can obviate the mixing of the water existing in the lower portion of the tank body 200 at a relatively low temperature with the water existing in the upper portion of the tank body 200 at a relatively high temperature. Also, only the cooler water in the lower portion of the tank body 200 can be supplied to a user.

As set forth above, according to exemplary embodiments of the invention, the water in the upper portion of the tank body is prevented from passing through the air vent hole formed in the water outlet pipe provided at the tank body of the cold water tank and draining through the water outlet pipe.

According to exemplary embodiments of the present invention, the water existing in the lower portion of the tank body at a relatively low temperature can be prevented from mixing with the water existing in the upper portion of the tank body at a relatively high temperature.

According to exemplary embodiments of the present invention, only the cooler water in the lower portion of the tank body can be supplied to a user.

The above structures of the embodiments can be combined as appropriate. Various modifications and alternations may be diversely made to the above embodiments without departing from the spirit of the present invention.

While the present invention has been shown and described in connection with the exemplary embodiments, it will be apparent to those skilled in the art that modifications and variations can be made without departing from the spirit and scope of the invention as defined by the appended claims.

What is claimed is:

1. A cold water tank comprising:
    a tank body;
    a water inlet pipe provided at the tank body to convey water into the tank body;
    a water outlet pipe provided at the tank body to convey the water out of the tank body, and including an air vent hole; and
    a floating member movably provided at the water outlet pipe to block the air vent hole when the water filling the tank body reaches a height of the air vent hole.

2. The cold water tank of claim 1, wherein the water outlet pipe is provided with a stopper preventing the floating member from descending to a predetermined height or lower.

3. The cold water tank of claim 1, wherein the tank body is provided with a receiving part receiving the floating member as the floating member ascends, and
    the air vent hole is formed at the same height as the receiving part, in the water outlet pipe.

4. The cold water tank of claim 3, wherein the receiving part is provided with a blocking member including another air vent hole.

5. The cold water tank of claim 1, wherein the water inlet pipe is connected to a water treatment apparatus including one or more water filters to convey water filtered through the water filters into the tank body.

6. The cold water tank of claim 5, wherein the water inlet pipe is directly connected to an outlet of the last water filter among the one or more water filters, and
    the water in the tank body drains out of the tank body through the water outlet pipe by the pressure of water discharged from the outlet of the last water filter.

7. A water treatment apparatus comprising:
    a water supply source supplying water; and
    a cold water tank of claim 1, the cold water tank being connected to the water supply source and receiving and discharging water by the pressure of water supplied from the water supply source.

8. The water treatment apparatus of claim 7, further comprising one or more water filters connected between the water supply source and the cold water tank, wherein the cold water tank is connected to an outlet of the last water filter among the one or more water filters.

* * * * *